(12) United States Patent
Azar et al.

(10) Patent No.: US 9,594,894 B2
(45) Date of Patent: *Mar. 14, 2017

(54) SYSTEM AND METHOD FOR ENABLING A CAMERA USED WITH AN ELECTRONIC DEVICE USING DETECTION OF A UNIQUE MOTION

(71) Applicant: Sensible Vision, Inc., Covert, MI (US)

(72) Inventors: Cyrus Azar, Spokane Valley, WA (US); George Brostoff, Covert, MI (US)

(73) Assignee: Sensible Vision, Inc., Cape Coral, FL (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/840,635

(22) Filed: Mar. 15, 2013

(65) Prior Publication Data

US 2014/0059673 A1    Feb. 27, 2014

Related U.S. Application Data

(63) Continuation of application No. 13/722,753, filed on Dec. 20, 2012, now Pat. No. 8,909,938.

(Continued)

(51) Int. Cl.
*G06F 21/40* (2013.01)
*G06F 21/32* (2013.01)
(Continued)

(52) U.S. Cl.
CPC .............. *G06F 21/40* (2013.01); *G06F 21/32* (2013.01); *G06K 9/00288* (2013.01);
(Continued)

(58) Field of Classification Search
CPC ....................................................... G06F 21/32
(Continued)

(56) References Cited

U.S. PATENT DOCUMENTS 5,229,764 A * 7/1993 Matchett ............ G07C 9/00158
340/5.52
5,280,530 A * 1/1994 Trew ...................... G01S 3/7864
348/14.16

(Continued)

OTHER PUBLICATIONS

Issue 3146: Screen unlock—press the dots instead of join the dots?; Android Open Source Project; Jul. 2009-Sep. 2011.*

(Continued)

*Primary Examiner* — James Turchen
(74) *Attorney, Agent, or Firm* — Frank M. Scutch, III

(57) ABSTRACT

A biometric recognition system for providing security for an electronic device includes a digital camera for providing a biometric image from a user of the electronic device and a touch screen for entering a user selected screen gesture. A processor is configured for use with the electronic device for comparing the biometric image to biometric image data and the user selected screen gesture with a screen gesture stored in a database. The digital camera can be enabled by providing a definitive movement of the electronic device by the user in a unique motion so to provide secure access to the electronic device when either the biometric image data or screen gesture are authenticated.

24 Claims, 10 Drawing Sheets

Related U.S. Application Data

(60) Provisional application No. 61/692,999, filed on Aug. 24, 2012.

(51) Int. Cl.
    *G06K 9/00*           (2006.01)
    *G06K 9/62*           (2006.01)
    *G07C 9/00*           (2006.01)
    *G06T 7/00*           (2006.01)
    *H04N 7/18*           (2006.01)
    *H04L 29/06*          (2006.01)

(52) U.S. Cl.
    CPC .......... *G06K 9/6255* (2013.01); *G06T 7/0012* (2013.01); *G07C 9/00158* (2013.01); *H04N 7/18* (2013.01); *G06F 2221/2139* (2013.01); *H04L 63/0861* (2013.01)

(58) Field of Classification Search
    USPC ......................................................... 713/186
    See application file for complete search history.

(56) References Cited

U.S. PATENT DOCUMENTS

| | | | | |
|---|---|---|---|---|
| 5,892,856 A * | 4/1999 | Cooper | G06T 7/20 | 348/152 |
| 6,035,406 A * | 3/2000 | Moussa | G06F 21/31 | 380/30 |
| 6,111,517 A * | 8/2000 | Atick | G06F 21/32 | 340/5.83 |
| 6,160,903 A * | 12/2000 | Hamid | G07C 9/00158 | 382/115 |
| 6,181,803 B1 * | 1/2001 | Davis | G06F 21/32 | 380/30 |
| 6,434,259 B1 * | 8/2002 | Hamid | G07C 9/00158 | 382/115 |
| 6,650,322 B2 * | 11/2003 | Dai | G06F 1/3203 | 345/212 |
| 6,651,168 B1 * | 11/2003 | Kao | G06F 21/32 | 713/155 |
| 6,810,480 B1 * | 10/2004 | Parker | G06F 21/32 | 713/168 |
| 6,853,739 B2 * | 2/2005 | Kyle | G06F 21/32 | 340/5.83 |
| 6,958,676 B1 * | 10/2005 | Morgan | G07B 15/063 | 235/380 |
| 6,993,166 B2 * | 1/2006 | Lo | G06K 9/00067 | 382/124 |
| 7,039,221 B1 * | 5/2006 | Tumey | G06K 9/00221 | 382/118 |
| 7,120,278 B2 * | 10/2006 | Sukegawa | G06K 9/6255 | 348/152 |
| 7,461,264 B2 * | 12/2008 | Chen | G06Q 20/3672 | 235/380 |
| 7,518,510 B2 * | 4/2009 | Kojo | G08B 13/1409 | 340/539.1 |
| 7,528,718 B2 * | 5/2009 | Adapathya | G06F 21/88 | 340/539.1 |
| 7,593,000 B1 * | 9/2009 | Chin | G06F 21/32 | 345/156 |
| 7,602,947 B1 * | 10/2009 | Lemelson | B60Q 1/0023 | 340/426.1 |
| 7,634,662 B2 * | 12/2009 | Monroe | G06K 9/00221 | 382/117 |
| 7,774,851 B2 * | 8/2010 | Singh | G06F 3/011 | 713/193 |
| 7,992,007 B2 * | 8/2011 | Lazzaro | G06Q 30/0641 | 713/183 |
| 8,223,024 B1 * | 7/2012 | Petrou | G02B 27/017 | 340/539.13 |
| 8,254,647 B1 * | 8/2012 | Nechyba | G06K 9/00248 | 382/118 |
| 8,467,770 B1 * | 6/2013 | Ben Ayed | H04L 63/107 | 455/41.1 |
| 8,504,842 B1 * | 8/2013 | Meacham | G06F 3/0488 | 713/182 |
| 8,583,095 B2 * | 11/2013 | Nakae | H04M 1/575 | 455/412.2 |
| 8,605,959 B2 * | 12/2013 | Kangas | G06F 21/316 | 382/124 |
| 8,626,597 B2 * | 1/2014 | Underwood | G06Q 30/06 | 705/26.1 |
| 8,776,200 B2 * | 7/2014 | Ryu | G06F 21/36 | 713/183 |
| 8,886,252 B2 * | 11/2014 | Luke | H04M 1/6041 | 455/550.1 |
| 8,913,004 B1 * | 12/2014 | Bozarth | G06K 9/00604 | 345/156 |
| 2003/0115473 A1 * | 6/2003 | Sugimura | G06F 21/32 | 713/186 |
| 2004/0003295 A1 * | 1/2004 | Elderfield | G07C 9/00087 | 713/176 |
| 2004/0117638 A1 * | 6/2004 | Monroe | G06K 9/00221 | 713/186 |
| 2006/0023915 A1 * | 2/2006 | Aalbu | G01S 13/04 | 382/103 |
| 2006/0053301 A1 * | 3/2006 | Shin | G06F 21/36 | 713/183 |
| 2006/0288234 A1 * | 12/2006 | Azar | G06F 21/32 | 713/186 |
| 2007/0192910 A1 * | 8/2007 | Vu | B25J 5/007 | 700/245 |
| 2007/0277224 A1 * | 11/2007 | Osborn | G06F 21/36 | 726/2 |
| 2008/0130961 A1 * | 6/2008 | Kinoshita | G06K 9/00281 | 382/118 |
| 2009/0160609 A1 * | 6/2009 | Lin | G06F 21/32 | 340/5.83 |
| 2009/0303205 A1 * | 12/2009 | Seibert | G06F 1/1616 | 345/204 |
| 2010/0162182 A1 * | 6/2010 | Oh | G06F 3/04883 | 715/863 |
| 2010/0257490 A1 * | 10/2010 | Lyon | G06F 3/0488 | 715/863 |
| 2011/0117970 A1 * | 5/2011 | Choi | G06F 3/0416 | 455/566 |
| 2011/0187497 A1 * | 8/2011 | Chin | H04L 9/32 | 340/5.54 |
| 2011/0260829 A1 * | 10/2011 | Lee | G06F 3/0414 | 340/5.51 |
| 2012/0007713 A1 * | 1/2012 | Nasiri | G06F 1/1694 | 340/5.81 |
| 2012/0011370 A1 * | 1/2012 | Duke | G06F 21/36 | 713/183 |
| 2012/0011564 A1 * | 1/2012 | Osborn | G06F 21/36 | 726/2 |
| 2012/0036485 A1 * | 2/2012 | Watkins et al. | | 715/863 |
| 2012/0066650 A1 * | 3/2012 | Tirpak | G06F 21/46 | 715/863 |
| 2013/0009875 A1 * | 1/2013 | Fry | G06F 3/0304 | 345/168 |
| 2013/0031619 A1 * | 1/2013 | Waltermann | G06F 21/305 | 726/8 |
| 2013/0063611 A1 * | 3/2013 | Papakipos | G06F 1/1686 | 348/207.11 |
| 2013/0088411 A1 * | 4/2013 | Reeves | G06F 3/1438 | 345/1.3 |
| 2013/0145457 A1 * | 6/2013 | Papakipos | G06F 21/6245 | 726/19 |
| 2013/0159939 A1 * | 6/2013 | Krishnamurthi | | 715/863 |
| 2013/0222611 A1 * | 8/2013 | Hsu | G06F 1/3231 | 348/207.1 |
| 2013/0229367 A1 * | 9/2013 | Pinch | G06F 21/36 | 345/173 |
| 2013/0318592 A1 * | 11/2013 | Grier, Sr. | H04L 9/3234 | 726/9 |
| 2014/0310643 A1 * | 10/2014 | Karmanenko | G06F 1/1626 | 715/784 |

(56) References Cited

U.S. PATENT DOCUMENTS

OTHER PUBLICATIONS

Google Flied Patents For Android Pattern Unlock and Gesture-Based Controls; Chris Velazco; Nov. 18, 2011.*
ShakeToUnlock Lets You Unlock Your iPhone by Shaking Gestures—Updated to Work With iOS 5—Download Now; Paul Morris; retrieved on Mar. 20, 2015; Jan. 9, 2012; http://www.redmondpie.com/shaketounlock-lets-you-unlock-your-iphone-by-shaking-gestures-updated-to-work-with-ios-5-download-now/.*
Motion-Based Cell Phone Unlock, Evan Ackerman, Apr. 17, 2009; retrieved from http://www.ohgizmo.com/2009/04/17/motion-based-cell-phone-unlock/ on Nov. 16, 2015.*
Alternative way to turn on/ wak screen (capacitive buttons/accelerometer); Feb. 9, 2011; retrieved from http://forum.xda-developers.com/showthread.php?t=947491.*

* cited by examiner

SYSTEM AND METHOD FOR ENABLING A CAMERA USED WITH AN ELECTRONIC DEVICE USING DETECTION OF A UNIQUE MOTION

PRIORITY CLAIM TO RELATED APPLICATION

This patent application claims the benefit of, and priority under §§119(e) and 120 to U.S. Provisional Application 61/692,999 filed Aug. 24, 2012 and U.S. patent application Ser. No. 13/722,753 filed Dec. 20, 2012 entitled System and Method for Providing Secure Access to an Electronic Device using Facial Biometrics which is a continuation of U.S. Pat. No. 8,370,639 filed on Jun. 16, 2006 assigned to Sensible Vision, Inc., the disclosure of which are all incorporated herein by reference.

FIELD OF THE INVENTION

This invention relates in general to electronic security and more particularly to a method using both a screen gesture and facial biometrics for authenticating the user of an electronic device.

BACKGROUND OF THE INVENTION

Many electronic devices such as personal computers, mobile devices including mobile phones and tablet devices use some form of authentication, typically a password that must be input into the device to gain access. The password is most often typed onto a keyboard or other interface which then allows the user to gain partial or full access to the utility of the device and/or network. A problem associated with using passwords is that they are time consuming and inconvenient for the user to enter. Users often use informal passwords or share their password with others which works to compromise system security. These practices negate the password's value and make it difficult to have an accurate auditing of access. Moreover, passwords are expensive to administer when forgotten or misplaced. Although the use of other types of security access systems such as voice recognition, fingerprint recognition or iris scans have been implemented, these types of systems require a different procedure to access and use the device. These techniques also require a specific and time-consuming enrollment process in order to be operational.

Biometric authentication using facial recognition is also often used to gain access to electronic devices. U.S. Pat. No. 6,853,739 to Kyle and U.S. Pat. No. 6,724,919 to Akiyama et al., which are both herein incorporated by reference, disclose examples of identity verification systems wherein a database is employed to compare facial features of a user to those in the pre-established database. Once a comparison is made, then authentication is verified and access is granted to the system. The disadvantage of this type of system is the requirement of a separate and specific enrollment procedure by the user to create the database. As with this type of facial recognition system and others in the prior art, the database must be populated before being used; otherwise, the system will not operate. This puts an unnecessary burden on the system operator, requiring detailed education on the steps to populate the database before the system may become operational. Additionally, this type of security system does not permit the automatic updating of the database to accommodate changes in head position, user features (such as different glasses), a change in the camera's operational characteristics, lighting and other environmental factors. This can limit the speed, accuracy, and even the success of database matching (recognition). Also, these prior art facial recognition and other biometric systems operate only at the instant of authentication.

Still other techniques use a gesture associated with the device's display. This type of recognition technique involves the user touching the device's touch screen and providing movements that are recognized by the device. These movements can be linked to device functionality such as operation of certain appliances or allowing access to the device. Another example of a security system using biometrics to supplement password entry is U.S. Pat. No. 7,161,468, "User Authentication Method and Apparatus," issued Jan. 9, 2007 to Hwang and Lee. Described therein is a user authentication apparatus that authenticates a user based on a password input by the user and the user's biometrics information. The user authentication apparatus includes a password input unit which determines whether a password has been input; a storage unit which stores a registered password and registered biometrics; a threshold value setting unit which sets a first threshold value if the input password matches with a registered password and sets a second threshold value if the input password does not match with the registered password; and a biometrics unit which obtains biometrics information from the outside, determines how much the obtained biometrics information matches with registered biometrics information, and authenticates a user if the extent to which the obtained biometrics information matches with registered biometrics information is larger than the first or second threshold value. As an example of how such a system could be adapted within the scope of the present invention, the biometrics input could be supplemented with a hidden action to either fully authenticate the user or convey a secondary password and associated actions, such as account restrictions, feigned access, or issuance of alerts, following previously configured rules.

Finally, U.S. Patent Publication 2009/0160609 to Lin describes a method of unlocking a locked computing device where the user's touch is used as a request to unlock a device while biometric information can be used with this process. Although the user may use a touch screen for a request to unlock the device, Lin does not use a combination of both a screen gesture and biometric information to authenticate the user.

These and other features, advantages, and objects of the present invention will be further understood and appreciated by those skilled in the art by reference to the following specification, claims, and appended drawings.

DETAILED DESCRIPTION

Figure 1:
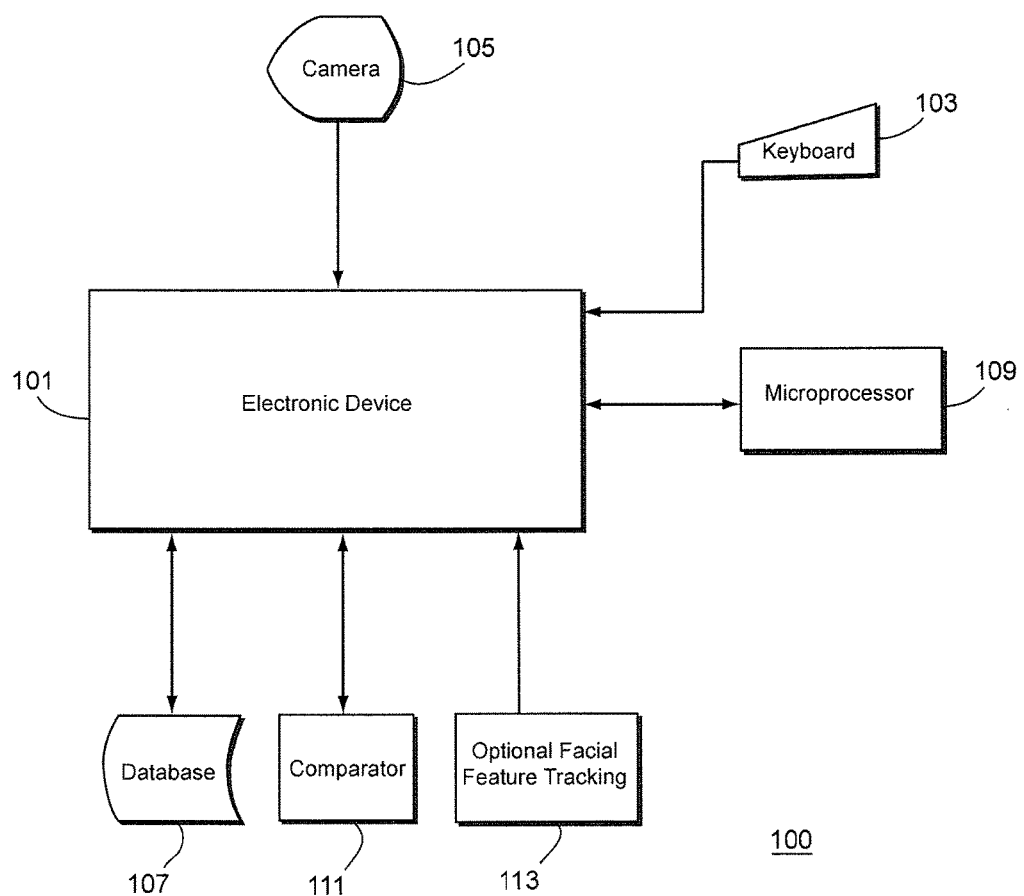
FIG. 1 is a block diagram showing the topology of the system and method of the invention wherein a camera is used to provide user system authentication.

An embodiment of the invention works to close a fundamental security hole that exists in many forms of existing security authentication for all types of electronic devices that require secure access. Existing security methods only confirm the user at the moment the user enters his or her password, scans his or her fingerprint, or iris, etc. The system has no ability to discern whether the current user is the same individual who authenticated even a few milliseconds earlier. This leaves the device completely unsecured and vulnerable until it is logged off or locked. It only takes a few moments for persons having malicious intent to steal and/or delete data from a device from which the user has already logged in. The existing solution is to require the user to manually lock/logoff, or create user inactivity timers to lock or logoff a user.

In addition, most information technology (IT) organizations resist change because they prefer not to risk changes that would affect their existing hardware/software systems. Also, they prefer not to expend the support costs necessary for implementing a solution. Support costs for training users and answering help desk questions can be significant factors. The present invention automates the database creation in way that is transparent to the end user. The invention requires little training with minimal "help desk" costs. The invention utilizes an auto-enrollment feature that permits the device to automatically update a database to constantly improve the quality of the user recognition. In contrast, current biometric products require a special set of steps to establish and update the database. In some cases, these steps can be performed by the user only after a learning orientation. In many cases, an IT administrator must work with the user to actually train the database before it can be used in the system.

Security compliance is also a major problem often requiring users to manually lock or logoff their computers when stepping away from them. This process is time consuming, cumbersome and is secondary to the user's purpose in using the computer. Moreover, locking or logging off requires the user to enter a password when the user returns to the device which is a major inconvenience. Unless rigorously enforced, users will typically ignore the proper security procedures. Short of direct observation, there is essentially no way for a system administrator to confirm that users are properly following a prescribed security policy.

One impractical solution has often involved the use of a timer. The timer works by locking the device when there is no peripheral activity within a predetermined time period. As will be recognized by those skilled in the art, the peripherals may include, but are not limited to, a mouse, keyboard or touch screen. If a timer is set to a short enough duration to reasonably close a security hole when the user steps away, the device will lock when the user is reviewing data on the screen. The user is then constantly inputting his or her credentials each time the system locks or logs the user off. This causes frustration for the user and greatly reduces productivity. As a result, typical inactivity times are at least 2-5 minutes, which provides a huge window of vulnerability. In addition, inactivity timers are ineffective. All an unauthorized user must do is access the system within the timer period. After that, the unauthorized user can continue working indefinitely.

The system and method of the present invention directly address these compliance issues by automating the process, thus ensuring complete compliance. Since the process is automated and transparent to the operator, user acceptance is very high. The users find the system is more convenient to use than before the installation of the present invention. Additionally, system audit logs showing persons who accessed the device are now accurate because of this continuous authentication security process. The invention operates by instantly locking/logging off when the user is out of view of the device and then unlocking as soon as the user reappears in front of the computer.

Referring now to FIG. 1, the system 100 as used in accordance with the present invention includes an electronic device 101 including, but not limited to, a personal computer, mobile telephone, alpha numeric paging device, personal digital assistant (PDA), electronic gaming device or the like which require some type of authentication to gain access to the utility of the device 101. A camera 105 may also be used to add an additional level of security to the device where the camera is used in connection with the device 101 to populate an internal database 107 with a plurality of image vectors. The camera provides substantially real-time images and typically runs at a rate of approximately 5-10 frames per second for continuously supplying digital image data to the electronic device 101. The camera is used in connection with an optional facial feature tracking software typically used within the device that works to track the movement of the user's face while in a position in front of the camera. Thus, as the user moves his head back and forth or side to side while using the device, the software used in connection with the camera will track this facial movement to allow continuous authentication while using low CPU and device resources 113.

Those skilled in the art will recognize that the camera 105 may be integrated into the electronic device 101 or it may stand alone as an accessory or peripheral, sending image data to the electronic device through a wired or wireless connection. As described in connection with the preferred method of the invention, a microprocessor 109 is then used with a comparator 111 for making a determination whether images continuously supplied by the camera 105 are human facial images. If a human facial image is detected, it is determined whether this image matches any of those stored in the database 107 from previous user sessions. Each vector represents a numerical representation of a digital image sent from the camera 105 to the electronic device 101. As will be discussed herein, the electronic device 101 makes a comparison between a vector established in the database 107 with a current vector provided by the camera 105. When a match is affirmatively established and the user is authenticated, the system 100 may be configured to allow a user either full or limited access to the electronic device 101.

Figure 2:
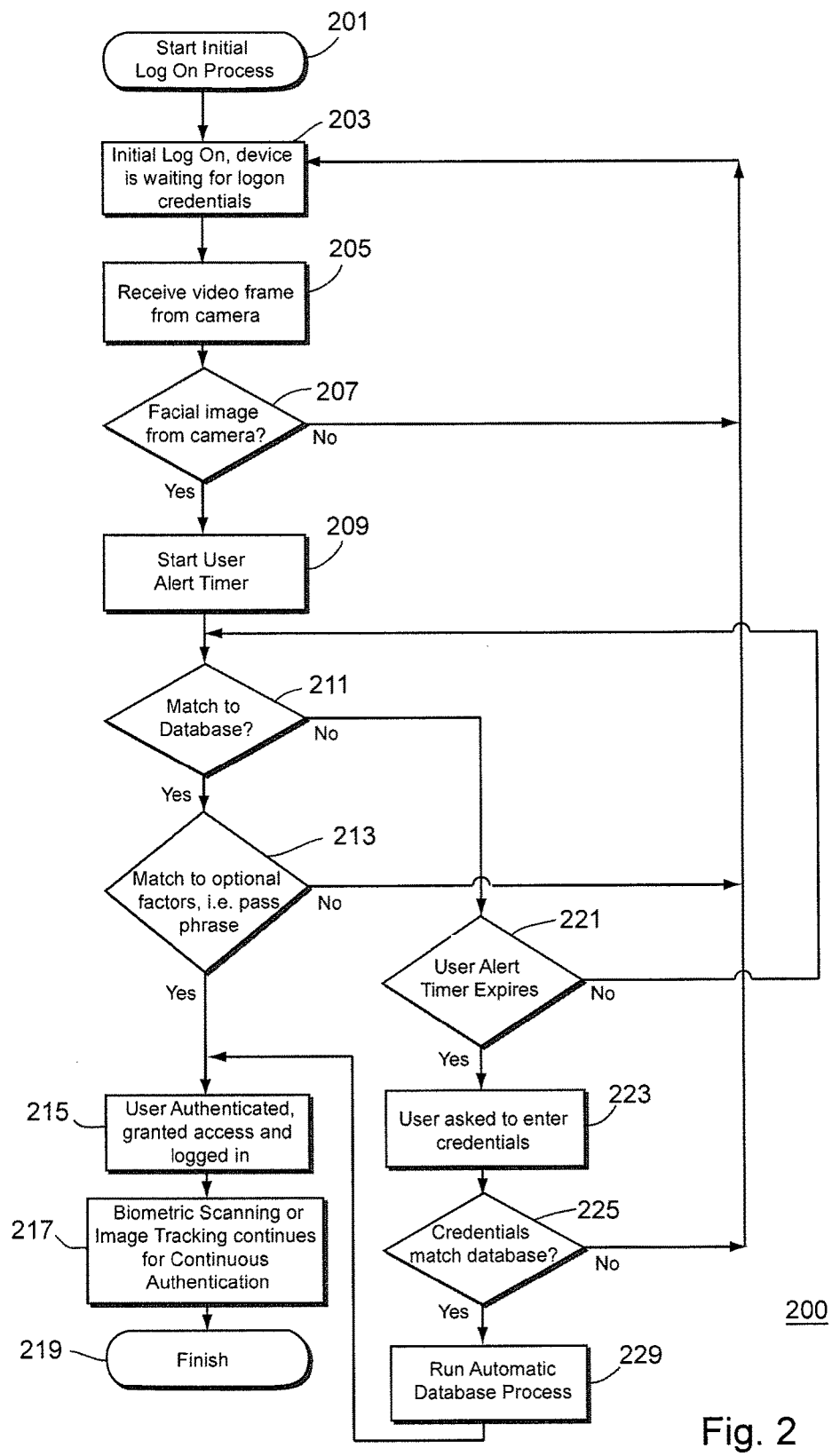
FIG. 2 is a flow chart diagram illustrating an overview of the method using facial biometrics.

FIG. 2 is a flow chart diagram illustrating an overview of the facial biometric method 100 of an embodiment of the present invention. Although this method is depicted as a sequence in FIG. 2, it will be evident to those skilled in the art that other iterations and definitions are possible without departing from the spirit and scope of the present method. These methods may include, but are not limited to, two-dimensional (2D), three-dimensional (3D), infra-red (IRE) and/or other facial recognition techniques. In the method for the facial biometric overview 200, the initial startup process for logging on to the device is initiated 201, and the device displays a screen 203 allowing the user to supply his or her login password or other authentication credentials. A video frame is received 205 from the camera associated with the device whereby the device then determines 207 whether the image data received from the camera is a facial image using face detection. If it is not a facial image, the device then continues to wait 203 for the user's login credentials.

However, if the image data is a facial image, a user alert timer is started 209. The user alert timer is used to establish some predetermined time within which the user should be authenticated before a message is displayed to the user to request the user to manually input his or her credentials. The expiration of the user alert timer has no effect on authentication other than to recommend to the user to login manually since the authentication process has exceeded an expected duration and the system would benefit from a database update. Thus, the camera frames continue to be evaluated even if the user is requested to enter a password. The system may be able to identify users as they are entering their credentials, speeding their access. So long as the user remains in front of the device, the system and method of the invention attempts to perform a database match. Even after authentication has occurred, each camera frame is evaluated utilizing this continuous authentication feature.

After the image from the camera is converted to an image vector, the device then determines 211 if the vector has any match to one already established in the database. If no match occurs and the user alert timer has not expired 221, then the device continues to process new incoming image vectors with those in the database to determine whether a match occurs. If the user alert timer has expired, the user is then requested 223 for his log-in credentials which may be input using a keyboard onto which the user can manually input a password or other credentials or, alternatively, another type of interface such as other biometric methods. Concurrently, the device continues to scan new incoming images/vectors for a match to the database 211. If at any time there is a match to the database 211, the system will proceed to match to optional factors 213. If the credentials input by the user do not match those stored in the database, the process starts again whereby the device waits for initial login credentials from the user 203 and scanning for vectors continues.

However, if the credentials do match those in the database and match the optional factors authentication factors 213, then the automatic database process is initiated which will be discussed with regard to FIG. 3. In the event that a match does occur between the current vector received from the camera and one stored in the database before the user alert timer 221 expires, then the user may be prompted for one or more additional authentication factors such as a pass phrase or a second password that provides an optional additional factor for authentication. If the user fails to provide this pass phrase or if the pass phrase does not match that in the database, the system returns to the start, the user alert timer is reset and the initial logon screen 203 is displayed.

Once the user is authenticated, the user is then granted access 215 and logged into the device for full or limited use of its features. An inventive aspect of the present invention, as compared to the prior art, is that the user is 217 is continuously scanned and authenticated once the user has gained access. Those skilled in the art will recognize that this continuous authentication process enables the user to step away from the device, allowing the viewing screen to be disabled so images present on the screen or monitor are no longer able to be viewed and data entry locked. Thus, text, images or other data presently displayed on the device may be easily secured when the user moves from the camera's field of view. Once the user again steps back into the camera's view, the method of the present invention provides for re-authentication of that user. Once re-authentication is established, the display and data entry are unlocked, allowing instant access to the device in the same state as when the user stepped from view.

In typical use, while a personal computer is secured using this method, the application software running on the device is unaffected and continues to run on the device, although with no display. However, the method of the invention allows the user to select to what extent the device will be affected when the device becomes locked or unlocked. Thus, the user may determine to have the device: 1) locked; 2) unlocked; 3) logon on; or 4) logged off, using this method. The "locking" of the device provides a secure desktop without disconnecting the user from a document or email server and without shutting down any application software running on the device. The display, keyboard and/or mouse on the device may be disabled while the user is not present within the camera's view. Once the user steps back into the field of view, the method provides for re-authentication. Once this security is reestablished, the device's display is again enabled for use. Hence, this process provides a simplified means of maintaining security of a personal computer or other device while the user is situated outside the camera's field of view. Since facial biometrics are used and the user is continuously authenticated, the user can be assured that data displayed on the device and access to the network will be secure when the user steps away from a work station for a moment or longer periods of time.

Figure 3:
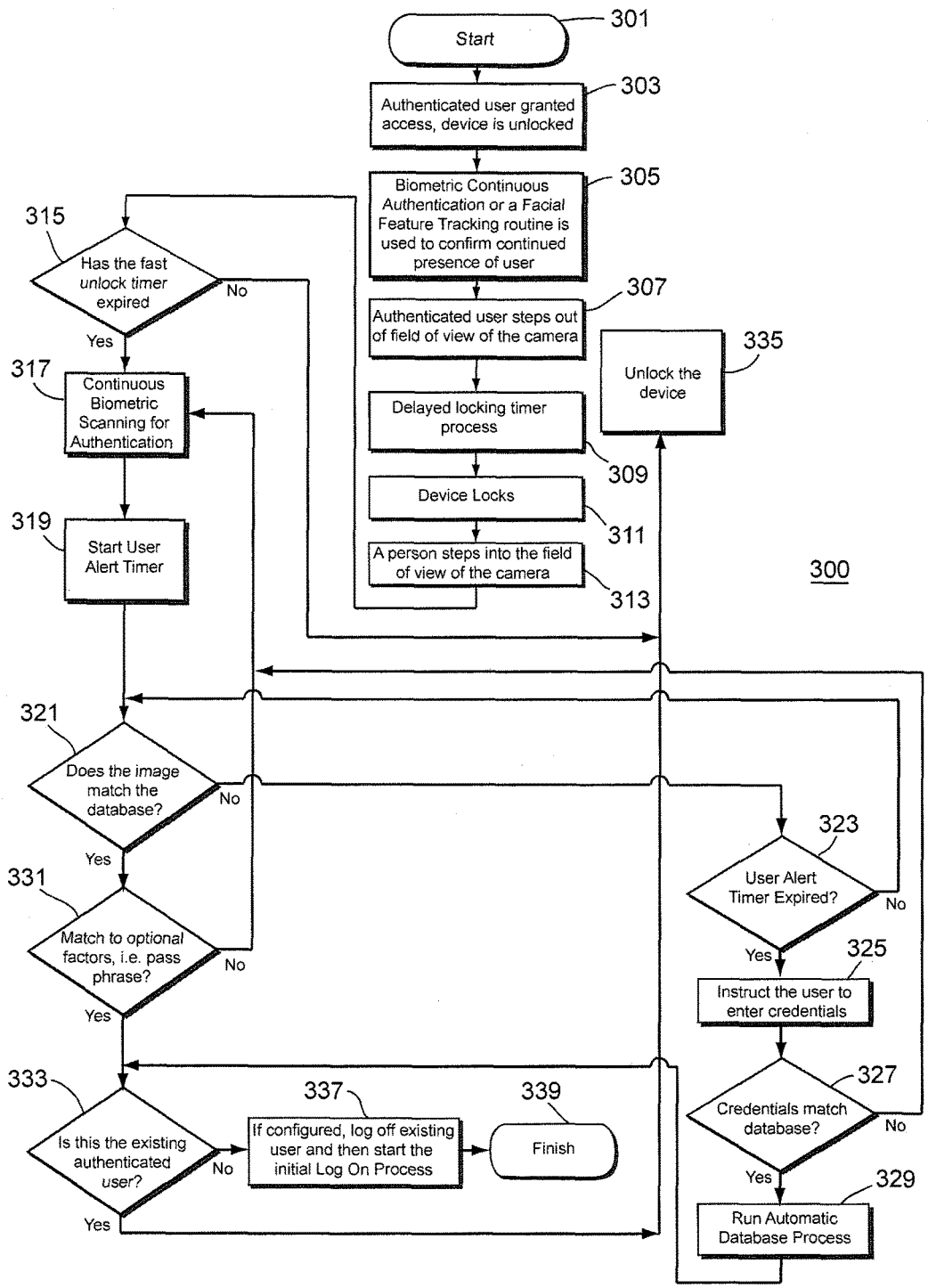
FIG. 3 is a flow chart diagram illustrating a continuous authentication routine used in accordance with an embodiment of the invention.

FIG. 3 is a flow chart diagram illustrating the continuous authentication routine as briefly described in FIG. 2. The continuous authentication process is a key feature of the invention since it allows the user to be easy re-authenticated after stepping from the camera's field of view. The continuous authentication process 300 begins 301 when an authenticated user is granted access and the device is unlocked 303. A biometric re-authentication or facial feature tracking routine is used to confirm 305 that the user remains present in the camera's field of view. Re-authentication of the user's face allows the highest degree of security while keeping the system unlocked. Conversely, Facial Feature tracking allows high security with low CPU resources by tracking the authenticated user's features. Facial Feature Tracking and continuous authentication is discussed herein with regard to FIG. 5.

If an authenticated user steps out of the field of view of the camera 307, an optional delayed locking timer process is initiated 309. The delayed locking timer process will be more fully described with regard to FIG. 5. After this process is complete, the device is locked 311. If a user does step into the field of view of the camera 313, a determination is made whether the optional fast unlock timer has expired 315. If used, the fast unlock timer is typically brief, usually 1-10 seconds. If the fast unlock timer has not expired, the device is unlocked 335 with the presence of any face rather than the recognition of a specific face. If the fast lock timer has expired, the device resumes 317 continuous biometric scanning for authentication. The user alert timer is restarted 319, and it is determined whether the image from the camera matches 321 a vector stored in the database. If the camera image does not match any stored image then it is determined whether the user alert timer has expired 323. If not, the process continues where the image is matched 321 against those in the database. If the user alert timer has expired, biometric scanning and database matching continues and the current user is requested 325 for his or her authentication credentials. If there is a match, the automatic database process is started 329 as more fully described in FIG. 4. If a database match is made before the user enters his or her credentials but the user alert timer has expired, the automatic database process 329 is executed. At the completion of the automatic database process, the user will be considered authenticated. The system will either unlock the device 335, or optionally logoff an existing user 337 who had locked the computer. The system will then automatically log on the new user to the user's account without any additional authentication.

If an image does initially match one that is in the database 321, the user may optionally be prompted 331 for additional authentication factors such as a pass phrase or other type of password. If there is no match for the additional authentication factors, the ongoing biometric scanning is continued 317. If there is a match, a determination 333 is made whether this is the existing authenticated user who may have just momentarily stepped from the field of view. If it is the existing authenticated user, the device is unlocked 335. If it is not the existing user, the device may be configured to log off 337 the existing user and start the initial log-in process 301 at which point the continuous authentication routine is completed 339.

Figure 4:
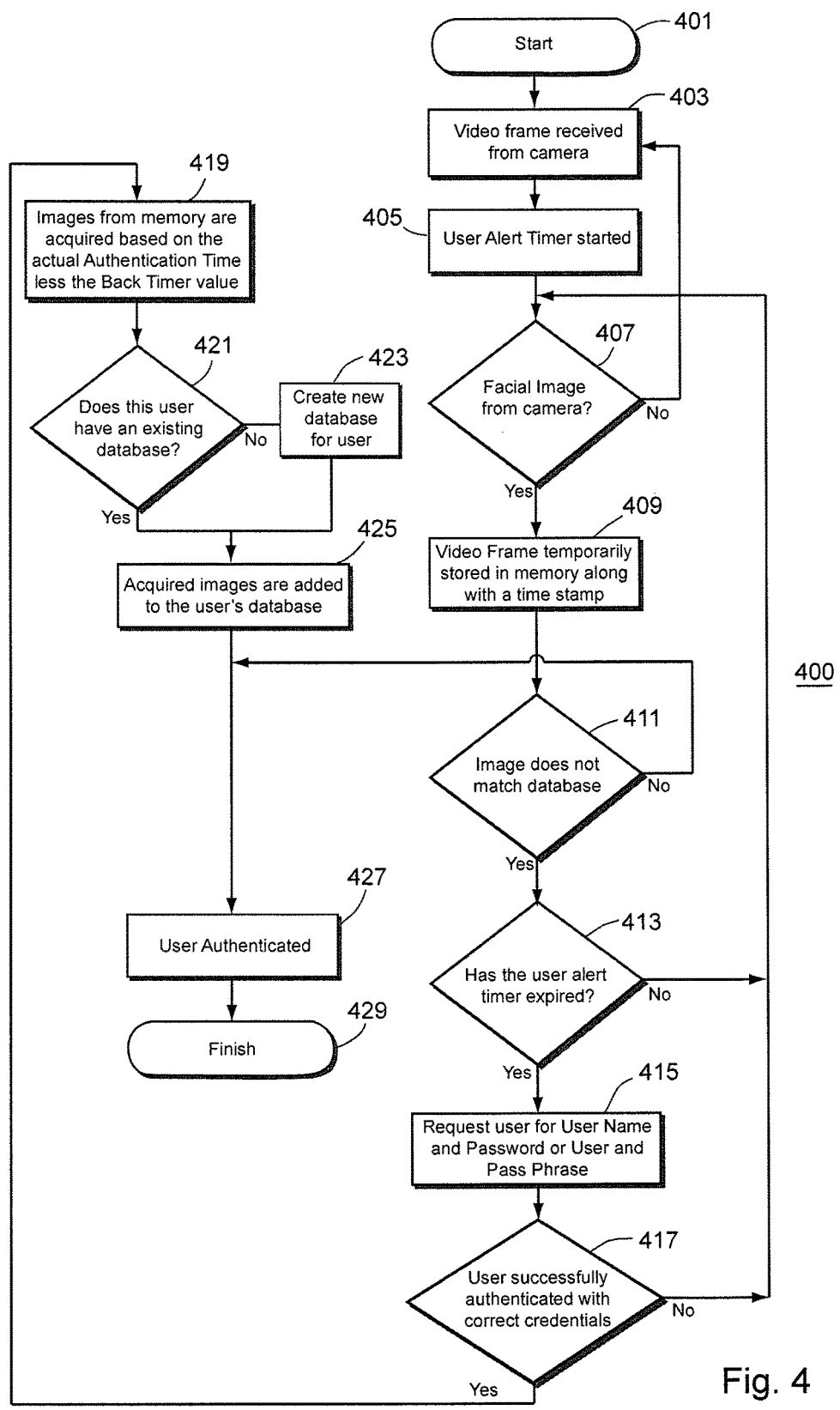
FIG. 4 is a flow chart diagram illustrating a back-timing process used with the automatic database in accordance with an embodiment of the invention.

FIG. 4 is a flow chart diagram illustrating the process for populating the database together with a back timer process 400 that can be used to improve the quality of the vectors in the database. The automatic database is a process by which the system database will be created or updated while a user uses the system and enters a password, or a database match occurred after the user alert timer expired. Although a password may initially be required, an objective of the automatic database is to permit the data to be populated through actual use rather than a specific enrollment procedure, whereby a user can eventually stop using password authentication and the method of the invention can be employed to authenticate using facial biometric data. By updating the database whenever it has taken too long a period of time for the database matching, the quality of the database is improved and the amount of time for subsequent database matches decreases. This also accommodates the various physical changes to a user's face over time, including ageing, changes in glasses, color of the skin (tanning), the position of the user's head relative to the camera, changing camera characteristic, and various environmental conditions including lighting. The purpose of the back timer process is to update the database with one or more images from a time previous to the actual recognition or authentication event. This permits the system to acquire higher quality images that closely match the head position of the user when the user is first accessing the device.

The automatic database and back timer process starts 401 when a video frame is received 403 from the camera. The user alert timer is started 405 and a determination is made 407 whether the image is a facial image. If it is not a facial image, the routine returns to receiving a video 403. Once a facial image is detected, the video frame is temporarily stored 409 in memory along with a time stamp. The time stamp denotes the actual time the facial image was processed by the camera. A comparison is made 411 to determine whether the image matches another image vector in the database. If a match occurs, then the user is authenticated 427. If no match occurs, a determination is made 413 whether the user alert timer has expired. If the user alert timer has not expired, the image is then reviewed 407 to determine whether it is a facial image. If the user alert timer has expired, the user is requested 415 for the user's name and password, pass phrase or the like. If the user is not authenticated with the correct credentials 417, the image is again reviewed 407 to determine whether it is a facial image. If the user is authenticated, then images from memory are acquired 419 based on the actual authentication time less the back timer value. Since video frames are still received 403 and database matching 411 continues while the user is requested to enter his or her credentials, the system may make a database match and proceed to User Authenticated 407 even as the user is entering his or her credentials. It is next determined 421 whether the user has preexisting images in the database. If the user does not have a preexisting image in the database, a new database is created 423 for that user. Subsequently, once the new database is created or preexisting images are available, the acquired images are added 425 to the user's database. The user is then authenticated 427 and the process is completed 429.

Figure 5:
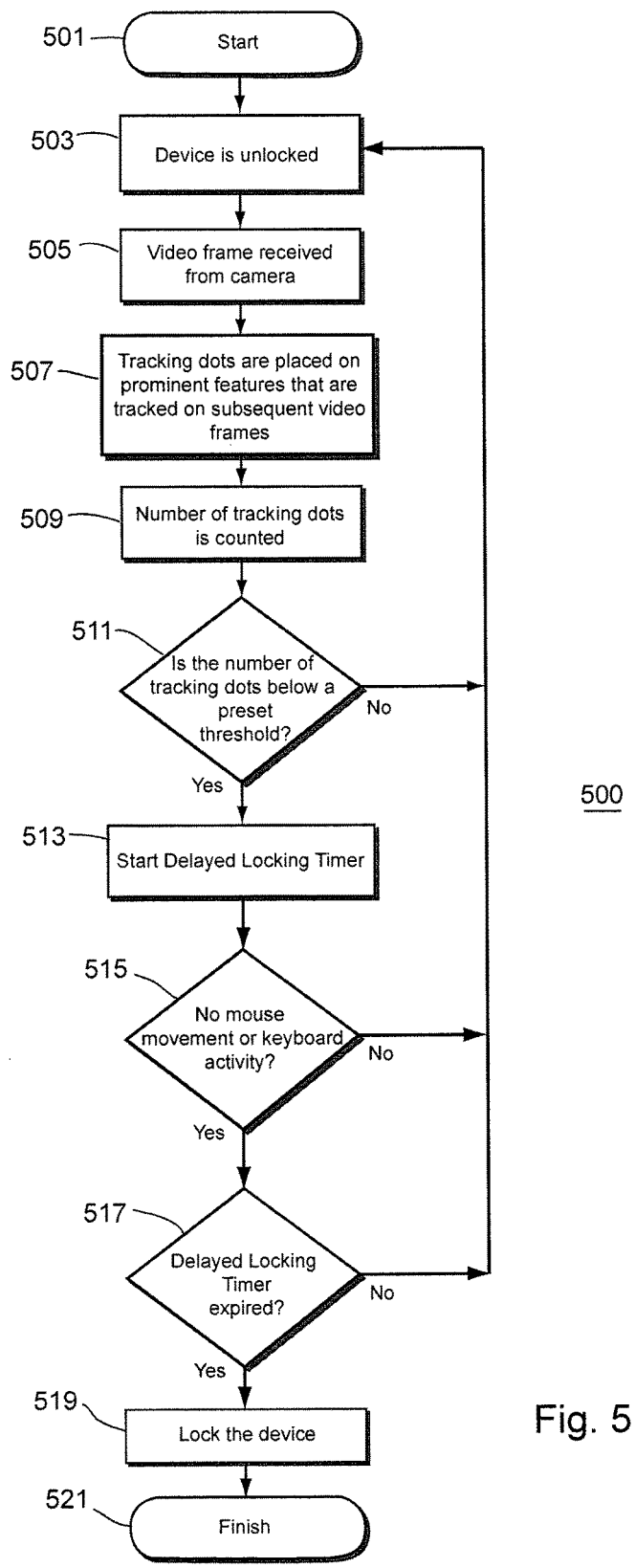
FIG. 5 is a flow chart diagram illustrating facial feature tracking and a delayed lock subroutine as used in accordance with an embodiment of the invention.

FIG. 5 is a flow chart diagram illustrating a continuous facial feature tracking and delayed lock process 500 as used for the continuous authentication embodiment of the invention. The benefit of facial feature tracking as a method of continuous authentication is a substantially low central processing unit (CPU) load and high tolerance for the position of the user's face relative to the camera. Since the system can lock or start a log off in a very short time period, the delayed locking timer permits the user to set how quickly the system locks to match the user's usage requirements. This process operates immediately after initial authentication 215 until the device is locked or logged off. If this condition exists, the system will remain unlocked if there is tracking of the user's face or any mouse or keyboard activity. This can be desirable as the locking/logoff action may occur too quickly. Once the mouse or keyboard activity is no longer detected, the method of the invention provides an optional predetermined time period before the device will be locked. If the user's face returns to the field of view or if keyboard/mouse activity is restarted before an inactivity timer expires, then the device will not lock and the timer is reset.

More specifically, the process starts 501 when an authenticated user is granted access to the device which is unlocked 503. A video frame is received from the camera 505 and one or more tracking dots are placed 507 on the prominent features of the user's face. The number of tracking dots are then counted 509 and a determination is made 511 of how many tracking dots are present. If tracking dots meet a minimum threshold, then the process begins again, where the user has been granted access 503 and the device remains unlocked. If the number of tracking dots is below the minimum threshold, the delay locking timer is started 513. The process for using the delayed locking timer is more fully described with regard to FIG. 6. It is next determined 515 whether there is any mouse, keyboard or other peripheral activity such as activity on a touch screen. If there is no activity, the process begins again 503 with the authenticated user having access to an unlocked device. If there is activity on the mouse or keyboard, it is determined 517 whether the delay locking timer 519 has expired. If the delayed locking timer has not expired, the process is restarted 503. If the locking timer has expired, the device is locked 529 and the process is completed 521.

Figure 6:
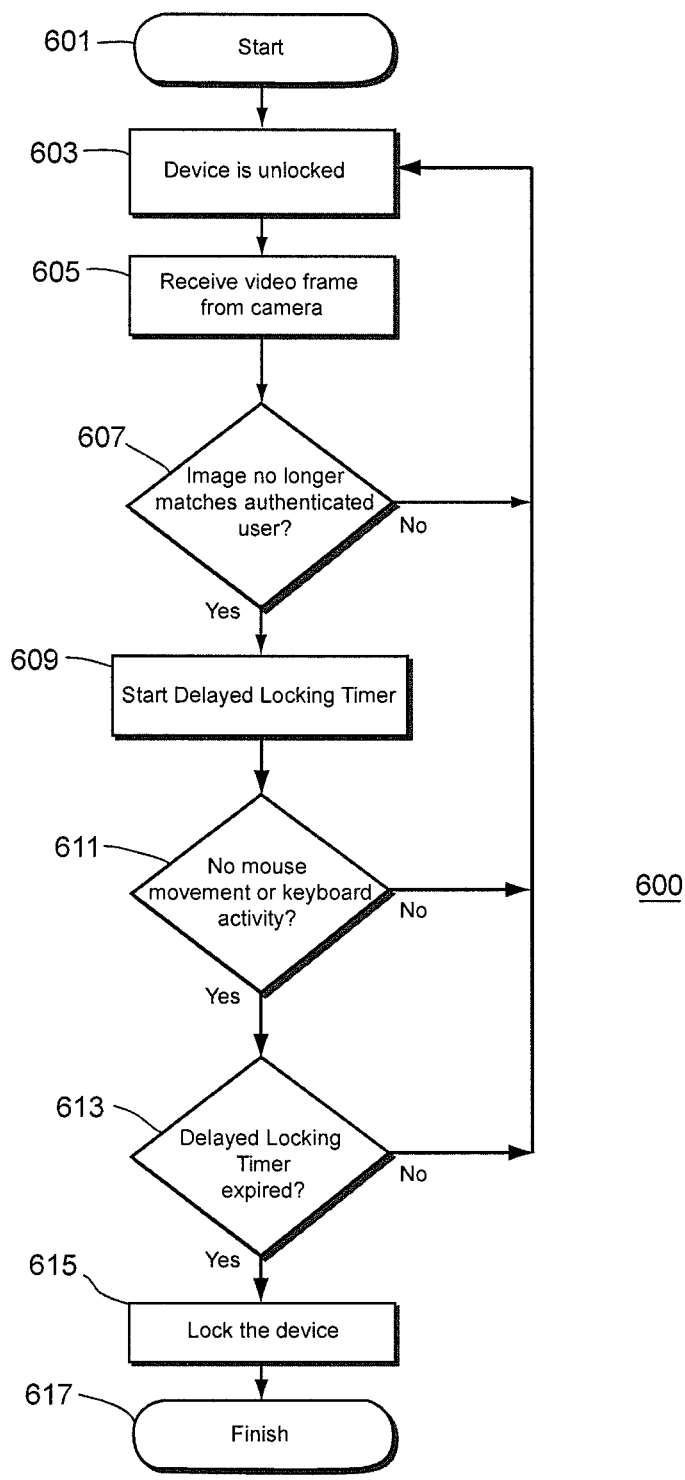
FIG. 6 is a flow chart diagram illustrating an alternative embodiment to the biometric authentication and delayed lock routine shown in FIG. 5 as used in accordance with the invention.

FIG. 6 illustrates a Continuous Biometric Authentication & Delayed Locking flow chart diagram which is an alternative embodiment to the Continuous Facial Feature Tracking and Delayed Lock process 500 as shown in FIG. 5. Although the method described in FIG. 6 is very similar to the tracking feature described in FIG. 5, continuous biometric authentication provides theoretically better security because it is constantly reconfirming the user. In practice the continuous facial feature tracking can lock the system so rapidly that it would be difficult for a new user to replace the existing user before the system locks. Matching database vectors for continuous biometric authentication is very CPU-intensive, and it requires a more consistent placement of the user's face in front of the camera. These two factors make continuous biometric authentication less desirable in many environments and devices. An alternative implementation would include a combination of both Continuous Biometric Authentication and Continuous Facial Feature Tracking where facial feature tracking is performed the majority of the time and Biometric Authentication is run at periodic intervals.

In FIG. 6, a continuous biometric authentication and the delayed lock process 600 are used. The process is started 601 when the user has been granted access 603 to an unlocked device. A video frame from the camera is received 605 and it is determined whether the image matches the authenticated user. If the images do not match, the process begins again with the user continuing access 603 to an unlocked device. If the image does not match that of an authenticated user, a delayed lock timer is started 609 and it is determined 611 whether there is any mouse or keyboard activity. If no activity is present and the delayed lock timer 613 has expired the device will lock or log off 615 and the routine will finish 617. If there is no activity 611 and the delayed locking timer has not expired 613, the device begins again 603. If there is activity 611 or the delayed locking timer 613 has not expired, the process begins again 603.

Figure 7:
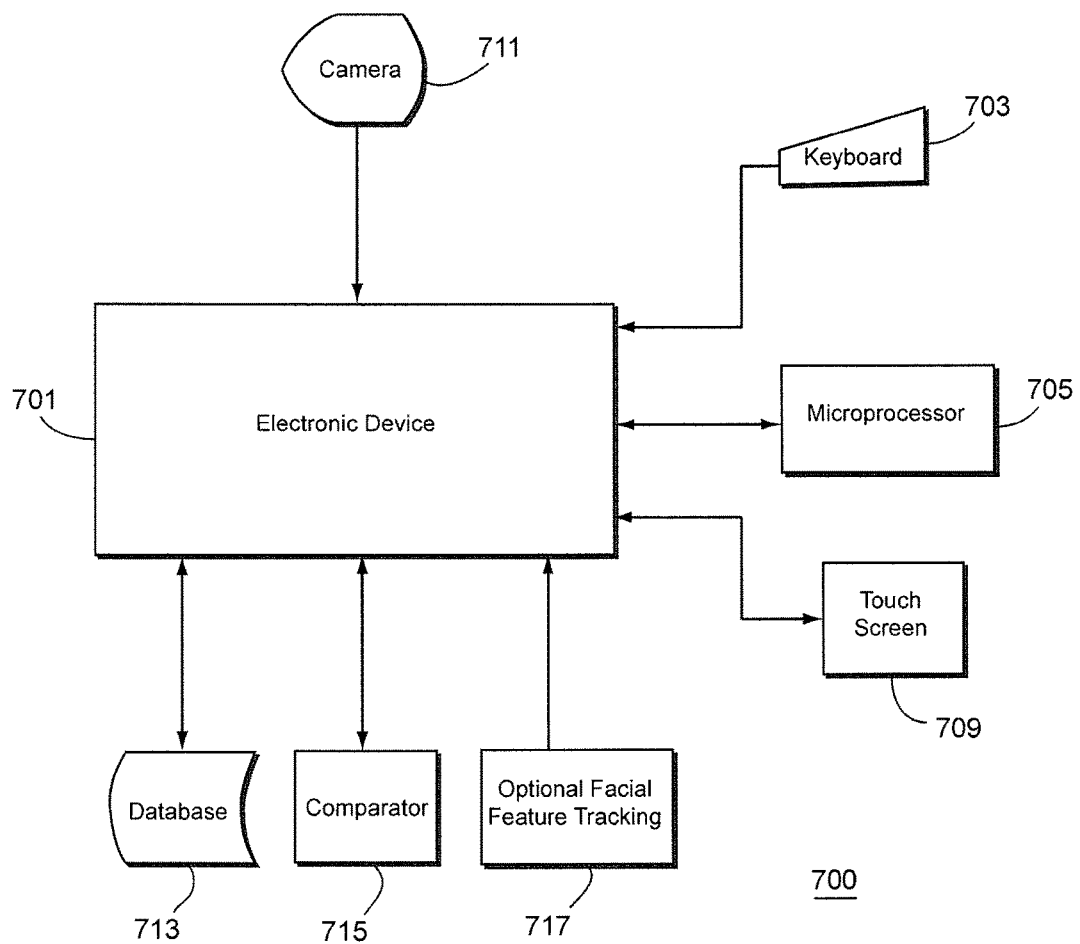
FIG. 7 is a block diagram showing the topology of the system and method of the invention wherein a screen gesture and camera are used to provide user system authentication in accordance with an alternative embodiment of the invention.

FIG. 7 is a block diagram showing the topology of the system and method of the invention wherein a screen gesture and camera are used to provide user system authentication in accordance with an alternative embodiment of the invention. Initially, those skilled in the art should recognize that a "tolerant" factor are those type inputs or factors that are tolerant since they can be accepted without having exacting precision to provide secure access to an electronic device. In contrast, other factors can be selected so that are an "exact" factor meaning their matching tolerance must be exactly and/or substantially precise in order to allow access to the device. The degree upon which the tolerant or exact factors will operate correctly are generally selected by the manufacturer of the software however, it is the combination of these types of factors that allow the method to provide a great deal of security for the device while still providing easy use and access by the user.

The system 700 includes each of the components as described with regard to FIG. 1 however, this device also includes a touch screen 709 that is connected to and used within the electronic device 701. Although shown using a separate keyboard 703, those skilled in the art will recognize that the keyboard 703 can also be integrated with the touch screen 709 in software to form a virtual keyboard so that the keyboard 703 and touch screen 709 would act as one device. As noted herein, the touch screen 709 will operate in combination with the camera 711 whose inputs are controlled and interpreted by the microprocessor 705. This allows the user to input a gesture into the touch screen 709 that is used in combination with the camera 711 to provide user authentication for the device. As described herein, a "gesture" may be a continuous input from forming a pattern shape from the user's finger to the touch screen or a discrete series of symbol inputs such as numbers, letters, symbols and/or shapes. These inputs are compared to data and other information stored in database 713. This data can be compared using a comparator 715 that provides a comparative type analysis for providing operational access to the electronic device 701. As described herein, an optical tracking feature 717 can also be used to insure the user of the device remains the same person with no gaps or breaches in security.

Figure 8:
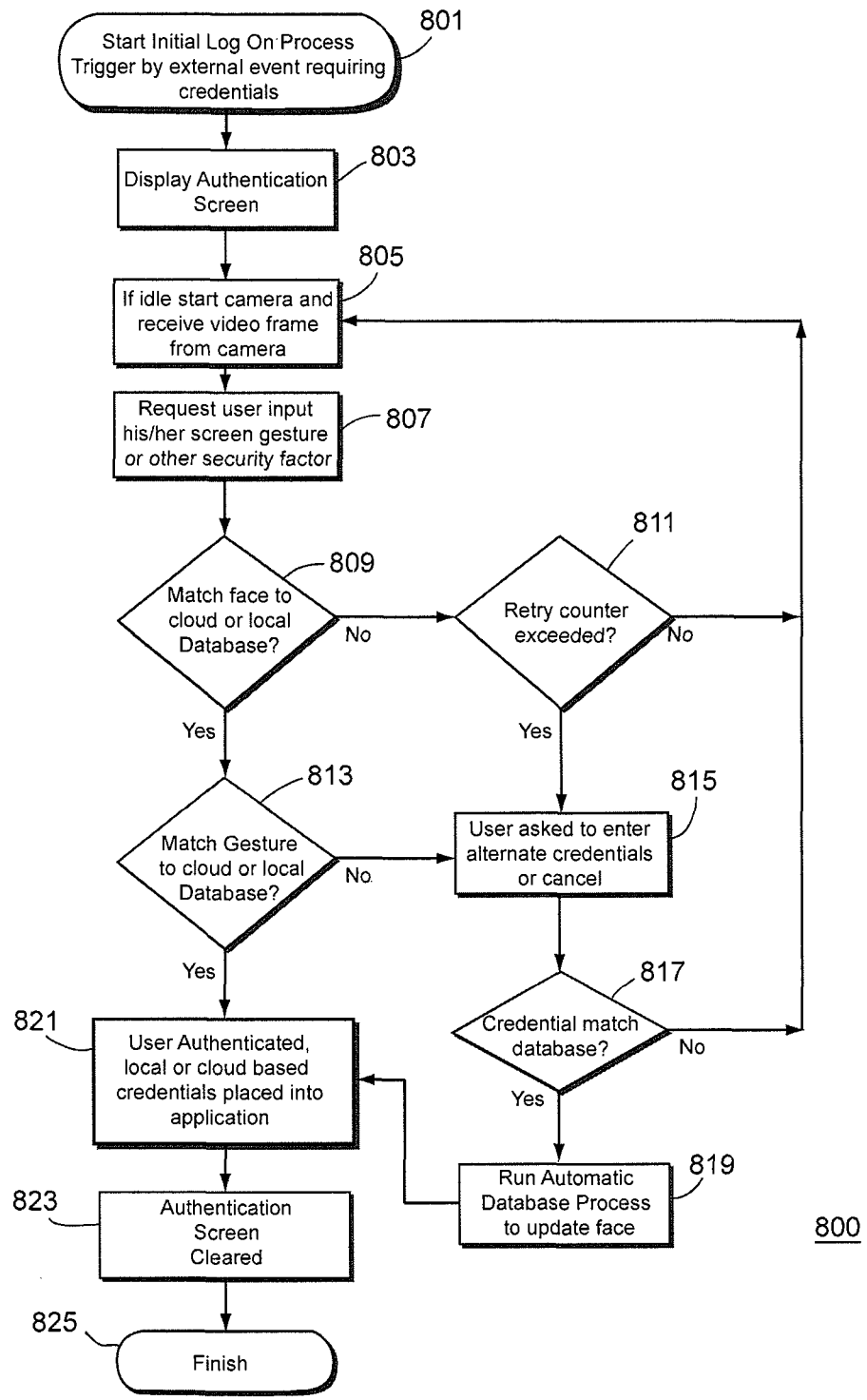
FIG. 8 is flow chart diagram illustrating yet another alternative embodiments for providing authentication of an electronic device using both a screen gesture and facial biometrics.

FIG. 8 is flow chart diagram illustrating yet another alternative embodiment for providing user authentication of an electronic device using both a screen gesture and facial biometrics. Those skilled in the art will recognize the invention can be implemented using a non-transitory computer readable medium having computer readable instructions stored thereon for execution by a processor. Although the use of gestures and biometric security systems are taught in the art, there presently is no system or method that works to combine these techniques for providing robust security while also providing a user with flexible access to an electronic device. The authentication process using both a screen gesture and facial biometrics 800 includes the steps of starting the initial "log-on" process 801 that triggers some external event requiring authentication credentials to be entered by the user. An authentication screen is then displayed 803 and at least one video frame is received by the camera 805 so that the user can then input a predetermined screen gesture or other security factor 807. The gesture is typically input to a touch screen using the user's finger, stylist or the like. The screen gesture may be either a single predetermined shape (letter, number, square, circle, etc.) continuously input by the user typically on a touch screen or the selection of a sequence of symbols and/or shapes that are entered in a predetermined order as described with regard to FIG. 9 herein. The skilled in the art will further recognize that the term "gesture" can refer to both the continuous movement of the user's finger on a screen to symbolize a shape or the discrete entry of shapes, symbols, numbers, letters etc. that may occur on a keypad on the touch screen.

Thereafter, a determination is made to match the facial recognition frame received by the camera to a cloud or local database 809. Those skilled in the art will recognize that "cloud computing" means using multiple server computers via a digital network, as though they were one computer. Computers using cloud computing may be accessed via the Internet or the like. If after some predetermined time period, a counter tracking the number of tried log-in attempts or other data is exceeded 811, then the user is asked to enter alternate credentials or cancel the request 815. If a predetermined number of attempts in the counter are not exceeded, then the camera will be used for supplying additional video frames 805. Once alternate credentials are entered, then a determination is made if the credentials match those stored in a database 817. If the credentials match, then an automatic database process is performed to update the images and/or other data stored in the database 819. However, if the credentials do not match, then the camera can be used for supplying additional video frames for authentication 805.

When the gesture does not match to the cloud or local database 813, then the user is again asked to enter alternative credentials or cancel the request 815. Alternative credentials can be a user name and password, screen gesture and/or the entry of unique symbols or shapes in a predetermined sequence. If the new credentials do not match, then the process starts again with at least one new frame from the camera 805. However if the new credentials do match then an update is performed on the automatic database to update the facial biometrics 819. However, if the gestures do match 813, then the user is authenticated and the local cloud based credentials can be placed into a specific application for granting access and/or use 821. Any updated biometric facial data 819 will be used in this authentication process 821. Thereafter, the authentication screen is cleared 823 and the process ends 825. Thus, by using both a screen gesture and some form of biometric recognition, the matching tolerance i.e. false rejections of the user are greatly reduced while still allowing a high level of security for the electronic device.

In typical use, a user on a Smartphone, or any electronic device requiring authentication, accesses the device or application that requires authentication. This authentication typically requires the entry of a user name and password. The method according to an embodiment of the invention authenticates by using the built-in front facing imaging device such as a camera to obtain a facial recognition template. The camera is typically built into the mobile phone such as a Smartphone or tablet. At substantially the same time, the user is prompted to enter a gesture that they had previously enrolled and stored in a local database or cloud. In the event it is too dark or for some reason the imaging device or camera cannot be used, then the user can use alternative credentials such as a gesture, password and/or sequence of secret shapes as described herein to gain access to the electronic device.

In use, both the face and a selected gesture is compared to the database of previously enrolled templates of enrolled users. By having both biometric facial data and gesture comparisons at substantially the same moment in time, the matching tolerance for each factor is reduced without reducing the reliability of the security. This allows for a greatly improved user experience since the conditions that normally would lead to a reduction in the confidence of facial recognition or gesture recognition would normally cause an undesired false rejection of the real user are greatly reduced.

Figure 9:
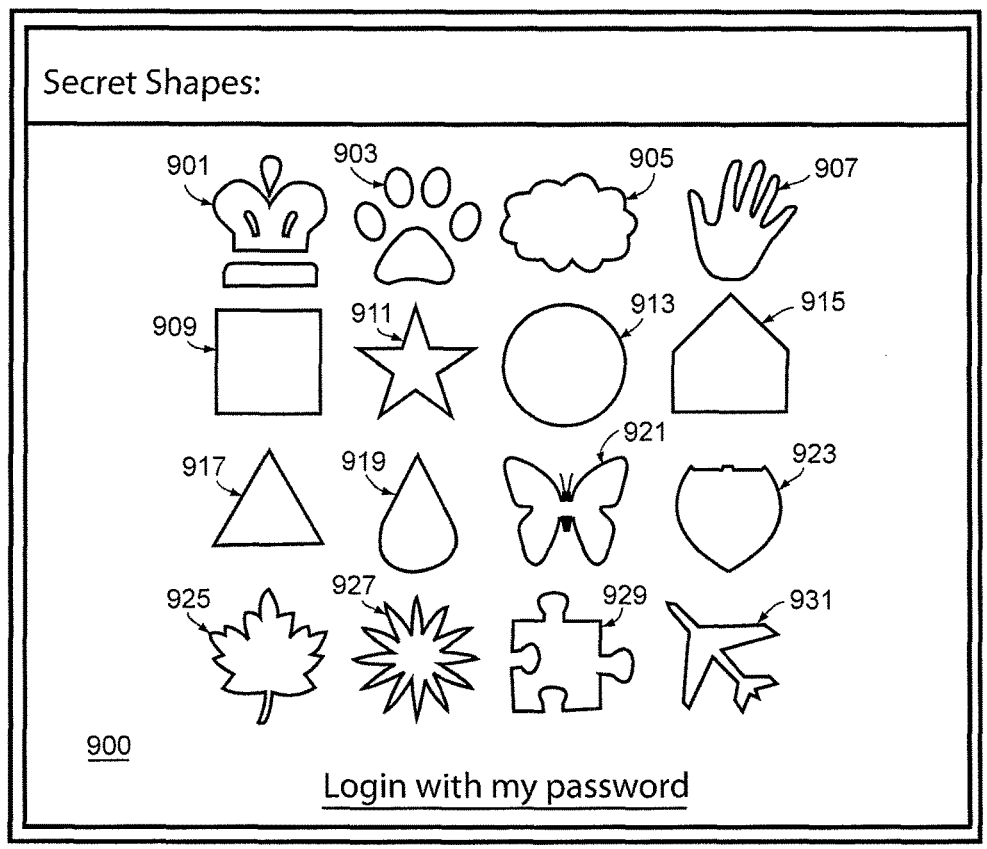
FIG. 9 is a diagram illustrating screen gesture shapes that can be used in accordance with an embodiment of the invention.

FIG. 9 illustrates shapes 900 such as a crown 901, paw 903, cloud 905, hand 907, square 909, star 911, circle 913, pentagon 915, triangle 917, tear drop 919, butter fly 921, sign 923, leaf 925, plant 927, puzzle piece 929 and airplane 931. Although the shapes 900 are default shapes that are "secret" shapes whose sequence is only known to the user, those skilled in the art will recognize that other custom shapes can be used in combination or in lieu of the default shapes. As described herein, one or more default shapes are selected in a predetermined sequence. Alternatively, a single shape can be used of different colors where the colored shapes be selected in a predetermined sequence. As shown in FIG. 9, the shapes are typically arranged in a grid like pattern that can be displayed in a fixed or random location in the grid. Thus, when setting up the gestures for authentication, the user can select the specific shapes, the number of shapes in a sequence, the sequential order the shapes are input by the user as well as whether the shapes are color or mono-chromatic such as gray scale shapes.

In use, both the biometric recognition and a selected gesture are compared to the database of previously enrolled templates of enrolled users. By having both biometric data and gesture comparisons at substantially the same moment in time, the matching tolerance for each factor is reduced without reducing the reliability of the security. This allows for a greatly improved user experience since the conditions that normally would lead to a reduction in the confidence of facial recognition or gesture recognition that would normally cause an undesired false rejection of the real user are greatly reduced.

Those skilled in the art will further recognize that many different variations of gesture and biometric information can work as exact factors/tolerant factors or the use of multiple tolerant factors can include but are not limited to:

Exact Factor and Tolerant Factors
   Password and Face
   Password and Gesture
   Password and Pattern
   Password and Fingerprint
   Pin and Face
   Pin and Voice
Multiple Tolerant Factors
   Face and Gesture
   Face and Partial Password (reduce number of password characters for acceptance)
   Face and Pattern
   Face and Fingerprint
   Face and Voice
   Face, Voice and Gesture Those skilled in the art will recognize that certain factors rely on exact matching while other factors, due to their nature of their design, use some level of "matching tolerance" also known as tolerant factors to determine acceptance of the gesture or credential. Examples of exact factors include a user's full password, smartcard or the code from a hardware security token. These factors must always precisely match the previously stored credentials for allowing access to the electronic device. In contrast, a tolerant factor would include all forms of biometrics (face, voice, retina and fingerprint) pattern in combination with a gesture entry where some predefined deviation/tolerance from an exact match to the stored credentials is permitted. Even a password can become a tolerant factor if less than the full length of the password is accepted under certain circumstances. This provides for a relaxed authentication for the electronic device.

Figure 10:
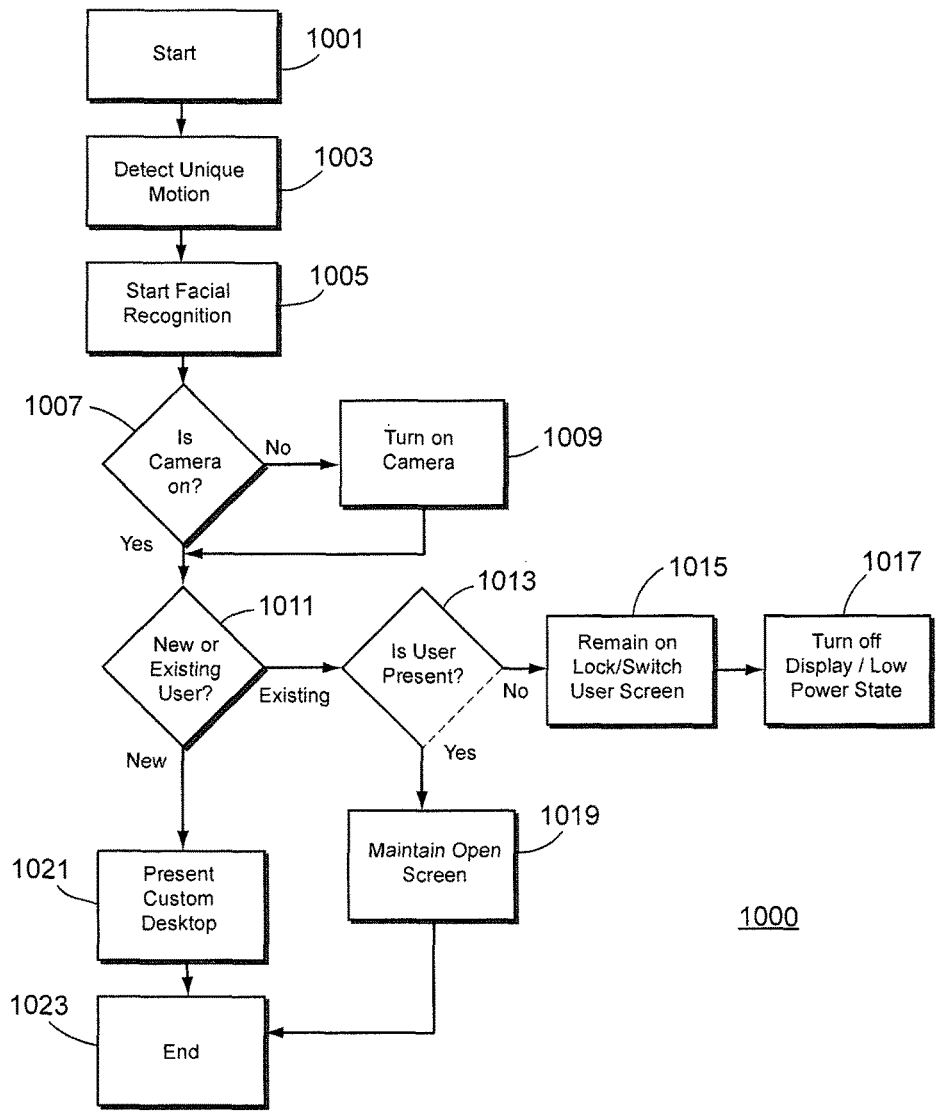
FIG. 10 is a flow chart diagram illustrating a process for detecting a unique and/or individualized motion at the electronic device.

FIG. 10 is a flow chart diagram illustrating detection of a unique and/or individualized motion at the electronic device. Today's mobile computing devices offer portability and are ideal to share. These devices can offer personated data specific to the use such as their photos, video/media and personal data. However it can be cumbersome and time consuming to activate the switching of users or even to lock the device for security. The method involves using a simple series of natural and uncomplicated motions performed by user. Motion is detected by one or more integrated motion sensors acting using gyroscopic principles or the like. These sensors are located within the device for allowing the device to either secure itself or activate a user switching activity.

As seen in FIG. 10, the motion detection process 1000 starts 1001 where a unique motion is detected 1003. The facial recognition process starts 1005 where a determination is made whether the camera is activated 1007. If not activated, the camera is turned on 1009 and a determination is made whether it is a new or existing user. If an existing user, then a further determination is made where the user is present at the device. If not, the device remains locked and/or a user screen can be selected to enable the user to authenticate 1015. If no, authentication is made, then the display can be deactivated and the device switched to a low power state 1017.

If, however, the user is present, then the screen can be maintained in an open state and the process ends 1023. Returned step 1021, if the user is a new user, then a custom desktop can be presented allowing the user free and/or unencumbered use the device for specified tasks 1021. Thereafter, the process ends 1023.

Thus, in one embodiment, the detection of a unique motion by the portable device can actuate and/or de-actuate functionality of the facial recognition security features. Thus, the detection of motion causes the device to either:

Present a screen to allow the user(s) to select their account
Using face recognition:
Turn on the camera if it was off
Attempt to recognize the user
If a new user is recognized, present that user his personalized data including media, perhaps a custom desktop etc
If the existing user is still present—
do nothing
If the device has been locked as part of switch process, switch back to his/her account or desktop
If no user is present—
Remain on the lock/switch user screen
Turn off the display and put the device into a lower power state In another embodiment, the detection of the motion can simply lock the device requiring authentication to progress as described herein. The process of detecting a unique motion as described in FIG. 10 also has other capabilities such as any method to identify the user of the electronic device. In addition to face recognition, the use of the unique motion may also be used in connection with voice recognition, gesture, shape, pin, password or a combination of these methods to confirm identity. Additionally, those skilled in the art will further recognize that motion switching can be turned off under certain circumstances. For example, it is common for people to share these devices when watching a video. If the sound is active on the device, the motion based user switch or lock can be disabled and/or delayed until the sound is no longer active. This technique will also support games which would require active motion of the device that might otherwise activate the switching or locking when this feature is not desired.

The type of unique or distinctive motion will be a definitive action that a user would not typically otherwise do while using the electronic device. For example a rocking motion might be used where the user tilts the device on its X axis 35 degrees up and down (+35 and −35) at least once. Further, a push-pull motion might be used where the user rotates the device on its Z axis 35 degrees forward and backward. Those skilled in the art will recognize that any motion or combination of motions are possible for enabling or disabling the electronic device.

Thus, the system and method of the invention provide fast, simple, and secure access to a personal computer or other electronic device that requires security. The invention combines the use of a screen gesture with biometric security in the authentication process. By combining two factors analyzed at substantially the same time, the tolerance match required by the tolerant factor(s) can be reduced without reducing the overall security accuracy of the electronic device. This allows a secure electronic device to be more consistently accessed rather than by using a facial recognition processes alone. It provides an ease of use while still maintaining a substantially high level of security. Moreover, a unique motion can be used that is detected by sensors in the electronic device for delaying or disabling facial recognition security for allowing the device to be used by others.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A biometric recognition system configured to provide security for an electronic device in an activated state comprising:
a digital camera having a field of view configured to provide at least one biometric image from a user of the electronic device where the digital camera, when in an off state, is enabled by providing a definitive movement of the electronic device by the user in a user selectable unique motion to provide first authentication credentials;
a touch screen configured to second authentication credentials;
at least one processor configured to use with the electronic device to:
execute a biometric security application configured to:
elect between using a cloud based database and a local database for matching the first authentication credentials used by the biometric security application to determine whether a user is an authenticated user by comparing the at least one biometric image to those stored in the cloud based database accessed using the Internet or the local database based on the election and further wherein the secondary authentication credentials, different from the first authentication credentials, are used only when the user is not authenticated using the first authentication credential; and
wherein the user is granted access to the electronic device if they are an authenticated user and wherein cloud based means using multiple server computers via a digital network as though they were one computer.

2. A facial biometric recognition system as in claim 1, wherein the electronic device is one from the group of personal computer, personal digital assistant, mobile telephone or gaming device.

3. An electronic device using facial biometric security configured to provide access comprising:
a digital camera configured to provide first authentication credentials based on at least one biometric image;
a touch screen configured to enter second authentication credentials based on user input data, wherein the secondary authentication credentials, different from the first authentication credentials, are used only when the user is not authenticated using the first authentication credentials;

a memory configured to store the first authentication credentials and second authentication credentials;

a microprocessor configured to execute a biometric security application configured to elect between using a cloud based database and a local database for matching the first authentication credentials used by the biometric security application to determine whether a user is an authenticated user by comparing first authentication credentials to those stored in the cloud based database accessed using the Internet or the local database based on the election; and wherein the electronic device, in an on state, detects a definitive movement of the electronic device by the user in a user-selectable unique motion for enabling only the digital camera from an off state, for providing user access to the electronic device in response to a determination the user is an authenticated user using the first authentication credentials or the second authentication credentials and wherein cloud based means using multiple server computers via a digital network as though they were one computer.

4. An electronic device as in claim 3, wherein a data entry area on the touch screen is dynamically moved for preventing recognition of previously entered second authentication credentials due to finger residue.

5. An electronic device as in claim 3, wherein the second authentication credentials are a screen gesture, pin or password.

6. An electronic device as in claim 3, wherein the second authentication credentials are a predetermined sequence of symbols selected by the user.

7. An electronic device as in claim 6, wherein the symbols are a plurality of geometric shapes.

8. An electronic device as in claim 3, wherein a data entry area on the touch screen is moved in order to prevent recognition of data entry due to finger residue.

9. An electronic device as in claim 3, wherein the electronic device is one from the group of a personal computer (PC), personal digital assistant (PDA), cellular telephone or gaming device.

10. An electronic device using facial biometric security configured to provide access comprising:

a digital camera enabled using a definitive movement of the electronic device by the user in a user-selectable unique motion for providing first authentication credentials based on at least one user image;

a touch screen configured to enter second authentication credentials based on user input data;

a memory configured to store the first authentication credentials and second authentication credentials;

a microprocessor configured to execute a biometric security application configured to elect between using a cloud based database and a local database for matching the first authentication credentials used by the biometric security application to determine whether a user is an authenticated user by comparing the first authentication credentials to those stored in the cloud based database accessed using the Internet or the local database based on the election and further wherein the second authentication credentials, different from the first authentication credentials, are used when the user is not authenticated using the first authentication credentials; and wherein the microprocessor is configured to grant the user access to the electronic device after the user is authenticated with valid first authentication credentials or second authentication credentials and wherein cloud based means using multiple server computers via a digital network as though they were one computer.

11. An electronic device as in claim 10, wherein a data entry area on the touch screen is dynamically moved for preventing recognition of previously entered data through due to finger residue.

12. An electronic device as in claim 10, wherein the second authentication credentials are a screen gesture.

13. An electronic device as in claim 10, wherein the second authentication credentials are a predetermined sequence of symbols selected by the user.

14. An electronic device as in claim 13, wherein the symbols are a plurality of shapes.

15. An electronic device as in claim 10, wherein a data entry area on the touch screen is dynamically moved in order to prevent recognition of data due to finger residue.

16. An electronic device as in claim 10, wherein the electronic device is one from the group of a personal computer (PC), personal digital assistant (PDA), cellular telephone or gaming device.

17. A method for providing security to an electronic device comprising the steps of:

providing an electronic device in an activated state;

providing at least one camera operating with the electronic device in a deactivated state;

activating the at least one camera if the electronic device detects a definitive user-selectable movement by the user in a unique motion;

providing first data from the at least one camera for use in access authentication;

executing a biometric security application configured to elect between using a cloud based database and a local database for matching the first data used by the biometric security application to determine whether a user is an authenticated user by comparing the first data to that stored in the cloud based database accessed using the Internet or the local database based on the election and further wherein second data, different from the first data, is provided from a touch screen display when the user is not authenticated using the first data; and granting the user access to the electronic device by the biometric security application if authenticated using the first data or second data and wherein cloud based means using multiple server computers via a digital network as though they were one computer.

18. A method for providing security as in claim 17, further comprising the step of:

using the user's face as the first data.

19. A method for providing security as in claim 17, further comprising the step of:

using a screen gesture as the second data.

20. A method for providing security as in claim 17, further comprising the step of:

using a predetermined sequence of symbols displayed on the touch screen display as the second data.

21. A method for providing security as in claim 20, further comprising the step of:

displaying a plurality of shapes as the symbols on the touch screen display as the second data.

22. A method for providing security as in claim 17, further comprising the step of:

moving a data entry area displayed on the touch screen display for preventing recognition of previously entered second data though residue left on the touch screen display.

23. A method for providing security as in claim 17, further comprising the step of:

providing a relaxed authentication when the first data and second data are authenticated and the match is within a predetermined tolerance.

24. A method for providing security as in claim 17, wherein the electric device is one from the group of: personal computer (PC), personal digital assistant (PDA), cellular telephone, gaming device or mobile telephone.

* * * * *